(12) United States Patent
Young et al.

(10) Patent No.: US 11,012,448 B2
(45) Date of Patent: May 18, 2021

(54) DYNAMIC CYBER EVENT ANALYSIS AND CONTROL

(71) Applicant: Bank of America Corporation, Charlotte, NC (US)

(72) Inventors: Michael Robert Young, Davidson, NC (US); Alexander Hutton, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 441 days.

(21) Appl. No.: 15/992,901

(22) Filed: May 30, 2018

(65) Prior Publication Data

US 2019/0372999 A1    Dec. 5, 2019

(51) Int. Cl.
*H04L 29/06* (2006.01)
*G06N 20/00* (2019.01)

(52) U.S. Cl.
CPC ......... *H04L 63/1416* (2013.01); *G06N 20/00* (2019.01); *H04L 63/1425* (2013.01); *H04L 63/1433* (2013.01)

(58) Field of Classification Search
CPC . H04L 63/14; H04L 63/1408; H04L 63/1416; H04L 63/1425; H04L 63/1433; H04L 63/1441; G06N 20/00
See application file for complete search history.

(56) References Cited

U.S. PATENT DOCUMENTS

| | | | |
|---|---|---|---|
| 6,088,804 A * | 7/2000 | Hill | G06F 21/552 726/25 |
| 8,468,153 B2 | 6/2013 | Truve et al. | |
| 8,782,790 B1 | 7/2014 | Smith et al. | |
| 8,863,279 B2 | 10/2014 | McDougal et al. | |
| 9,009,820 B1 | 4/2015 | McDougal et al. | |
| 9,065,849 B1 | 6/2015 | Rivera et al. | |
| 9,083,741 B2 * | 7/2015 | Powers | H04L 63/1416 |

(Continued)

OTHER PUBLICATIONS

Dilshan Keragala, "Detecting Malware and Sandbox Evasion Techniques", SANS Institute InfoSec Reading Room, Jan. 16, 2016, 27 pages, downloaded on May 30, 2018 from <www.sans.org/reading-room/whitepapers/forensics/detecting-malware-sandbox-evasion-techniques-36667>.

*Primary Examiner* — Linglan E Edwards
(74) *Attorney, Agent, or Firm* — Banner & Witcoff, Ltd.; Michael A. Springs

(57) ABSTRACT

Systems for analyzing and controlling cyber events are provided. In some examples, indicator or compromise (IOC) data may be received. The system may parse the data to identify one or more IOC parameters within the IOC data. In some examples, the IOC parameters may be compared to known IOC parameters to determine whether the IOC parameters are known. If not, the newly identified IOC parameters may be stored in a database. The identified IOC parameters may be evaluated to identify one or more linkages associated with the IOC parameters. For instance, each IOC parameters may be evaluated to identify one or more other parameters associated with each parameter. Those linkages may indicate a threat or potential threat. Based on the evaluation, the system may generate, update and/or execute one or more blocks. For instance, access to one or more domain name, email address, or the like, may be locked based on the identified IOC parameters, linkages, and the like.

24 Claims, 9 Drawing Sheets

(56) References Cited

U.S. PATENT DOCUMENTS

| | | |
|---|---|---|
| 9,118,714 B1 | 8/2015 | Thomson et al. |
| 9,386,041 B2 | 7/2016 | Carver et al. |
| 9,430,646 B1 | 8/2016 | Mushtaq et al. |
| 9,455,993 B2 | 9/2016 | Lewis et al. |
| 9,501,645 B2 | 11/2016 | Hendel et al. |
| 9,584,541 B1 | 2/2017 | Weinstein et al. |
| 9,609,007 B1 | 3/2017 | Rivlin et al. |
| 9,654,485 B1 * | 5/2017 | Neumann ............ H04L 63/1441 |
| 9,667,641 B2 | 5/2017 | Muddu et al. |
| 9,690,938 B1 | 6/2017 | Saxe et al. |
| 9,697,352 B1 | 7/2017 | Armstrong |
| 9,740,862 B1 | 8/2017 | Quinlan et al. |
| 9,794,279 B2 | 10/2017 | DiValentin et al. |
| 9,825,989 B1 | 11/2017 | Mehra et al. |
| 9,910,986 B1 | 3/2018 | Saxe et al. |
| 9,942,253 B2 * | 4/2018 | Freedman ................ H04L 43/10 |
| 2012/0291125 A1 | 11/2012 | Maria |
| 2014/0013233 A1 | 1/2014 | Ahlberg et al. |
| 2015/0326589 A1 * | 11/2015 | Smith ..................... H04L 63/02 |
| | | 726/1 |
| 2016/0028758 A1 | 1/2016 | Ellis et al. |
| 2017/0366582 A1 | 12/2017 | Kothekar et al. |
| 2018/0063163 A1 | 3/2018 | Pevny et al. |
| 2019/0130440 A1 * | 5/2019 | Qiu .................... G06Q 30/0248 |

* cited by examiner

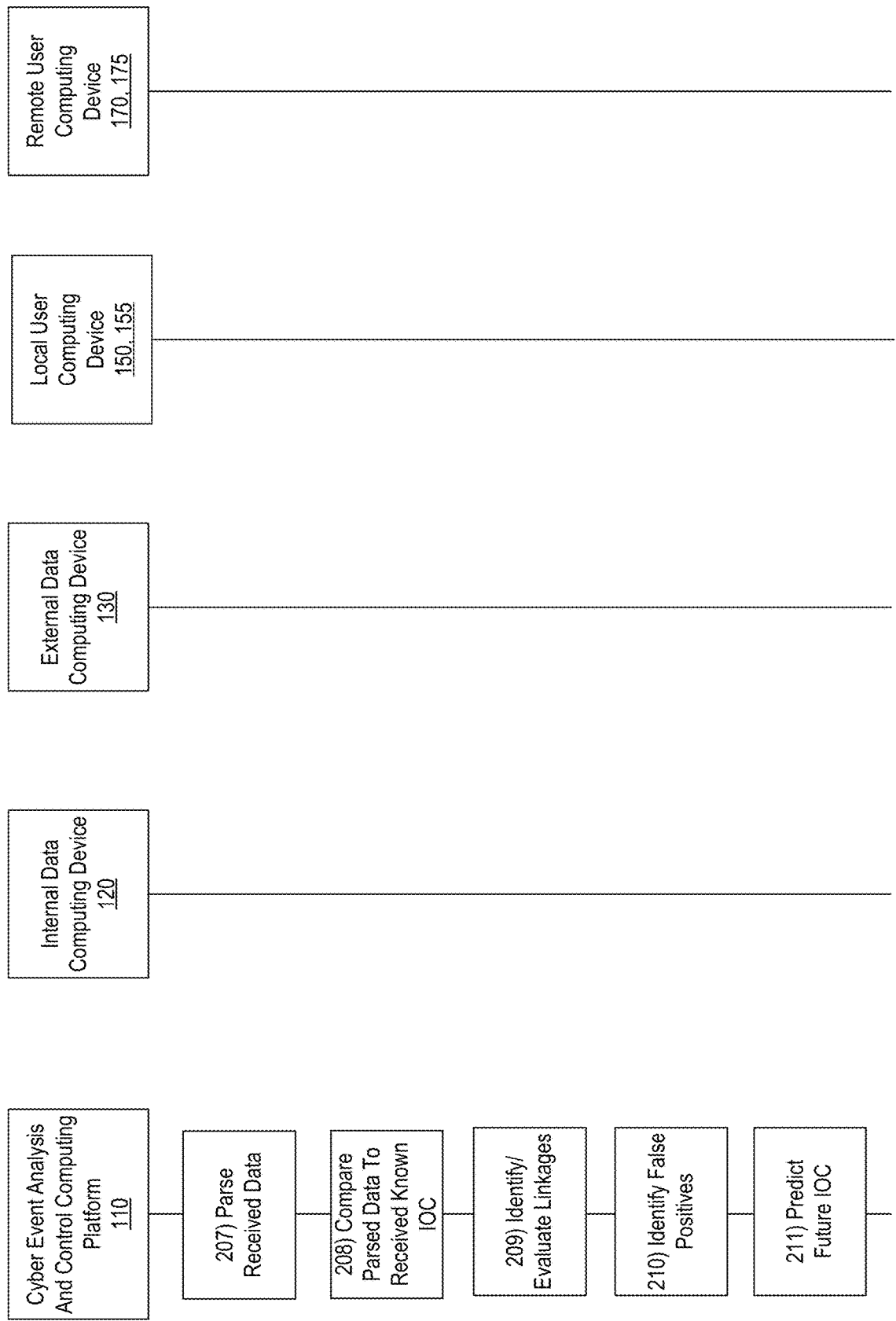

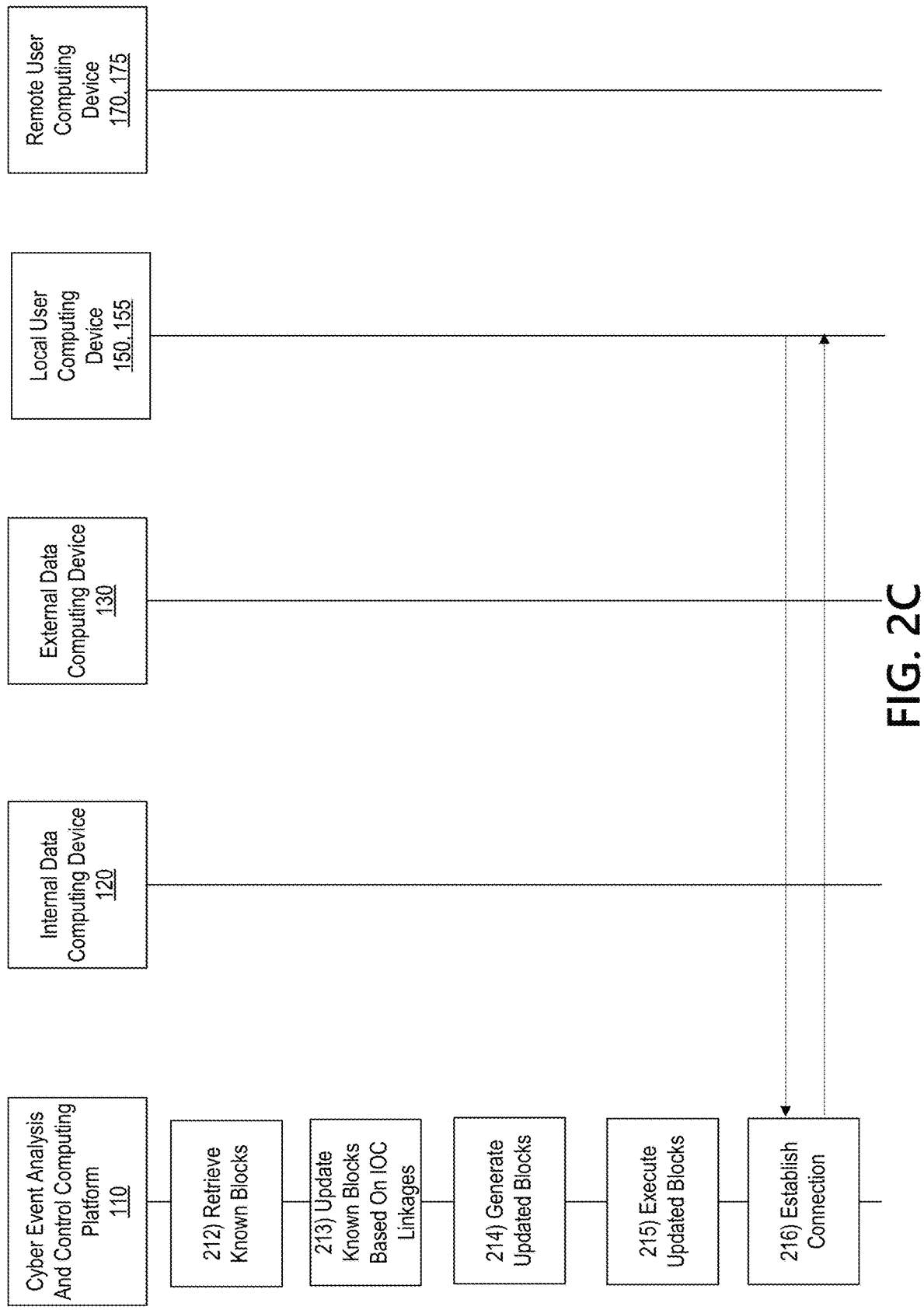

DYNAMIC CYBER EVENT ANALYSIS AND CONTROL

BACKGROUND

Aspects of the disclosure relate to electrical computers, systems, and machine learning. In particular, one or more aspects of the disclosure relate to using machine learning to evaluate cyber events for potential threats and execute controls to reduce impact of potential threats.

Cyber events including cyber threats are important concerns for corporate and other entities. Companies are often trying to find ways to identify threats as quickly as possible and take action to mitigate any impact of a threat. Indicators of compromise, such as virus signatures, Internet protocol (IP) addresses, and the like, can provide an indication of a computer or system intrusion. However, identifying only the IOC can be insufficient to mitigate impact. Accordingly, in conventional systems, users may evaluate each IOC and associated parameters to attempt to identify other related items that may be a threat. However, this system is time consuming, inefficient and error prone. Further, conventional systems do not provide a fast enough response time to identify the threat quickly and possibly eliminate the risk. Accordingly, it would be advantageous to use machine learning to evaluate IOCs, identify all linkages related to an IOC or IOC parameter and predict future potential threats based on that information.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with efficiently identifying and evaluating potential cyber events.

In some examples, a system, computing platform, or the like, may receive indicator or compromise (IOC) data. In some examples, the IOC data may be received in text format. The system, computing platform, or the like may parse the data to identify one or more IOC parameters within the IOC data. In some examples, the IOC parameters may be compared to known IOC parameters to determine whether the IOC parameters are known. If not, the newly identified IOC parameters may be stored in a database.

In some examples, the identified IOC parameters may be evaluated to identify one or more linkages associated with the IOC parameters. For instance, each IOC parameters may be evaluated to identify one or more other parameters or IOC parameters associated with each parameter. Those linkages may indicate a threat or potential threat.

Based on the evaluation, the system, computing platform, or the like, may generate, update and/or execute one or more blocks. For instance, based on the identified IOC parameters, linkages, and the like, one or more websites, domain names, IP addresses, email addresses, and the like, may be blocked (e.g., access may be prevented). If any new items should be blocked, a block will be generated and executed to prevent access to the potentially harmful item.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for implementing cyber event analysis and control functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to analyzing and controlling cyber events, such as cyber threats, cyber attacks, and the like. In some examples, machine learning may be used to evaluate indicators of compromise, identify linkages associated with parameters of each indicator of compromise and dynamically generate and execute blocks of potentially harmful items in order to reduce or mitigate impact associated with the harmful item.

As mentioned above, cyber threats are an important concern for corporate and other entities. Often cyber events occur without any prior knowledge by the entity. By the time the entity has been made aware of the cyber event, it may be too late to prevent impact by the cyber event.

Accordingly, aspects described herein relate to a system for evaluating indicators of compromise. In some examples, data in text format (e.g., white papers, input from a user, and the like) may include indicator of compromise data. This data may be parsed to extract indicator of compromise parameters, such as a domain name, IP address, email address, or the like, associated with the indicator of compromise.

In some examples, the parameters may be evaluated to identify linkages associated with each parameter. Linkages may include other domain names, IP addresses, email addresses, and the like, associated with the indicator of compromise parameter. In some arrangements, linkages identified may then be evaluated to identify a second or other additional level of linkages. Accordingly, a web of data identifying indicator of compromise parameters and associations may be generated. As new indicator of compromise data is received, it can be evaluated to quickly identify associated domain names, IP addresses, and the like, that may also pose a threat. In some examples, the evaluation may be performed in real-time or near real-time in order to enable the system to dynamically generate blocks to one or more harmful items (e.g., to prevent access by one or more devices to the harmful item) and execute any blocks.

These and various other arrangements will be discussed more fully below.

Figure 1A:
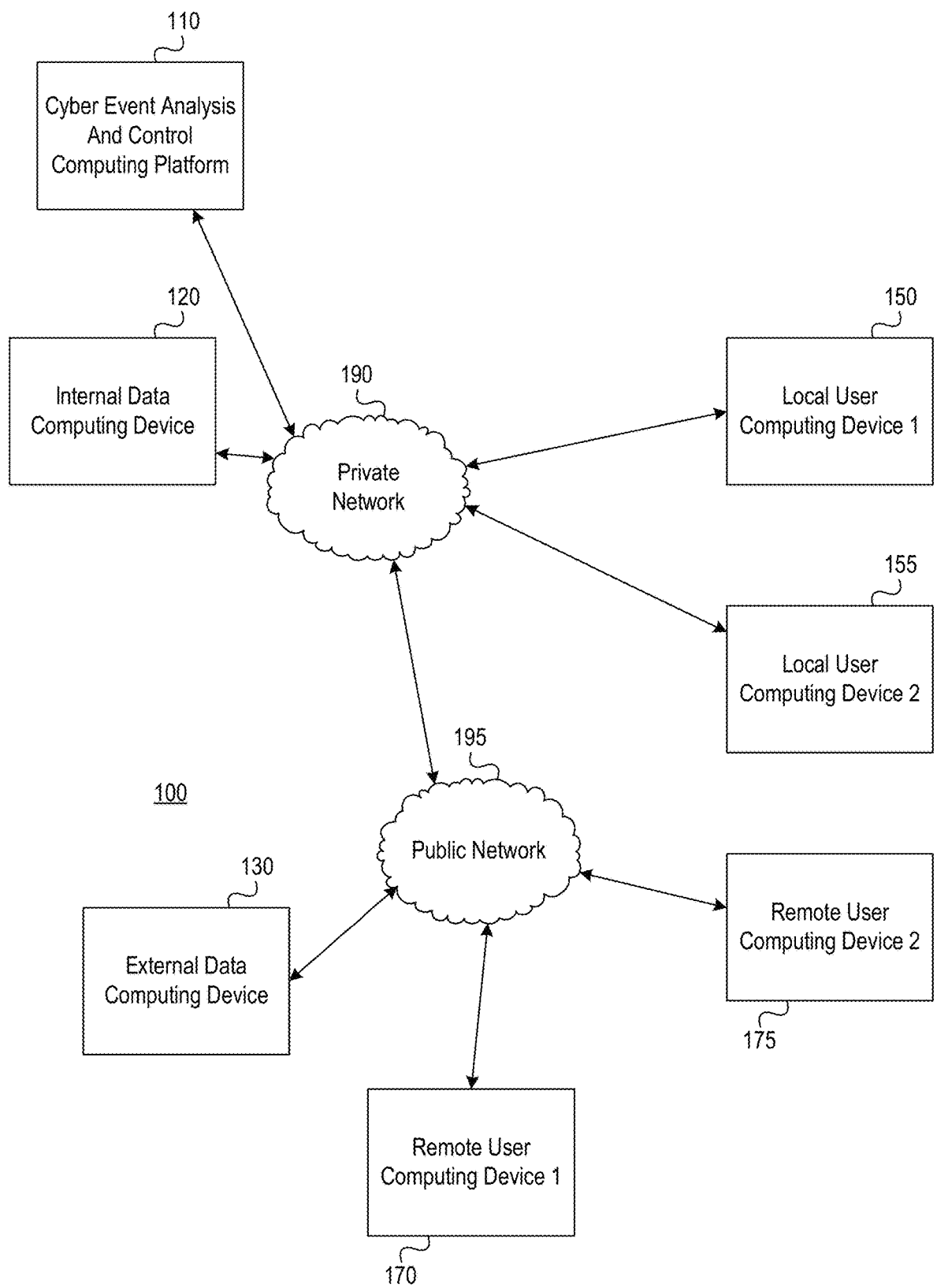
FIGS. 1A and 1B depict an illustrative computing environment for implementing cyber event analysis and control functions in accordance with one or more aspects described herein.
Figure 1B:
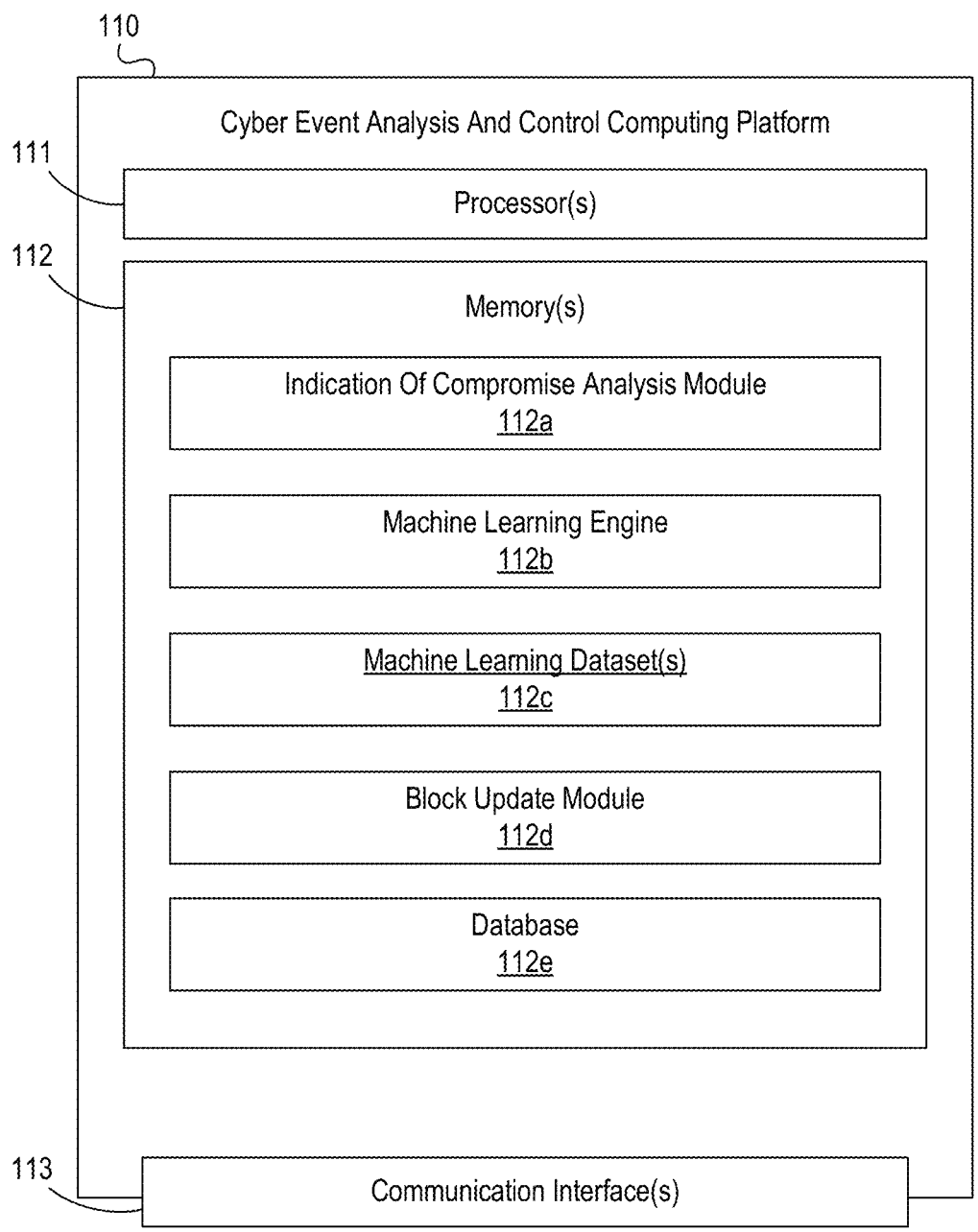

FIGS. 1A and 1B depict an illustrative computing environment for implementing and using a system for dynamic cyber event analysis and control in accordance with one or more aspects described herein. Referring to FIG. 1A, computing environment 100 may include one or more computing devices and/or other computing systems. For example, computing environment 100 may include a cyber event analysis and control computing platform 110, an internal data computing device 120, an external data computing device 130, a first local user computing device 150, a second local user computing device 155, a first remote user computing device 170, and a second remote user computing device 175.

Cyber event analysis and control computing platform 110 may be configured to host and/or execute a machine learning engine to provide dynamic cyber event analysis and control functions. In some examples, data related to a plurality of indicators of compromise (IOC) may be received from one or more sources. In some examples, the received IOC data may be received from a plurality of different computing devices, systems, or the like.

The cyber event analysis and control computing platform 110 may analyze the IOC data and may parse the received IOC data to identify a type of data, a domain name, an Internet protocol (IP) address, an email address, and the like. The cyber event analysis and control computing platform 110 may match the parsed data to known IOC parameters to identify one or more IOC parameters that might not have been previously identified. The IOC parameters may be evaluated and one or more linkages associated with each IOC parameter may be identified. For instance, other systems, devices, types of data, domain names, IP addresses, email addresses and the like linked to the parsed data associated with each IOC parameter may be identified. These identified linkages may then be flagged as threats or potential and stored in a database. Additionally or alternatively, the identified linkages may be used to dynamically update blocked items, such as blocked websites, email addresses, types of data, and the like.

Internal data computing device 120 may be configured to store, transmit, and/or receive data associated with one or more internal data or computer systems. For instance, an entity implementing the cyber event analysis and control computing platform 110 may store data associated with various users, IOCs, IOC parameters, and the like.

External data computing device 130 may be configured to store, transmit and/or receive data associated with one or more external data or computer systems. For instance, external data computing device 130 may include publicly available information related to IOCs, IP addresses, websites, domain names, and the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to control or implement aspects of the functions performed by cyber event analysis and control computing platform 110, to transmit or receive potential IOCs, to execute blocking operations dynamically implemented, and the like.

The remote user computing devices 170, 175 may be used to communicate with, for example, cyber event analysis and control computing platform 110, to receive and/or transmit potential IOCs, to execute blocking operations dynamically implemented, and the like.

In one or more arrangements, internal data computing device 120, external data computing device 130, local user computing device 150, local user computing device 155, remote user computing device 170, and/or remote user computing device 175 may be any type of computing device or combination of devices capable of performing the particular functions described herein. For example, internal data computing device 120, external data computing device 130, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of internal data computing device 120, external data computing device 130, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include cyber event analysis and control computing platform 110. As illustrated in greater detail below, cyber event analysis and control computing platform 110 may include one or more computing devices configured to perform one or more of the functions described herein. For example, cyber event analysis and control computing platform 110 may include one or more computers (e.g., laptop computers, desktop computers, servers, server blades, or the like).

As mentioned above, computing environment 100 also may include one or more networks, which may interconnect one or more of cyber event analysis and control computing platform 110, internal data computing device 120, external data computing device 130, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, cyber event analysis and control computing platform 110, internal data computing device 120, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect cyber event analysis and control computing platform 110, internal data computing device 120, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., cyber event analysis and control computing platform 110, internal data computing device 120, local user computing device 150, local user computing device 155) with one or more networks and/or computing devices that are not associated with the organization. For example, external data computing device 130, remote user computing device 170, and/or remote user computing device 175 might not be associated with an organization that operates private network 190 (e.g., because external data computing device 130, remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect external data computing device 130, remote user computing device 170 and remote user computing device 175 to private network 190 and/or one or more computing devices connected thereto (e.g., cyber event analysis and control computing platform 110, internal data computing device 120, local user computing device 150, local user computing device 155).

Referring to FIG. 1B, cyber event analysis and control computing platform 110 may include one or more processors 111, memory 112, and communication interface 113. A data bus may interconnect processor(s) 111, memory 112, and communication interface 113. Communication interface 113 may be a network interface configured to support communication between cyber event analysis and control computing platform 110 and one or more networks (e.g., private network 190, public network 195, or the like). Memory 112 may include one or more program modules having instructions that when executed by processor(s) 111 cause cyber event analysis and control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of cyber event analysis and control computing platform 110 and/or by different computing devices that may form and/or otherwise make up cyber event analysis and control computing platform 110.

For example, memory 112 may have, store, and/or include an indication of compromise analysis module 112a. Indication of compromise analysis module 112a may store instructions and/or data that may cause or enable the cyber event analysis and control computing platform 110 to receive data associated with IOCs or potential IOCs. The data may be received from one or more computing systems, devices, applications, or the like. In some examples, the data may be received in text format and may be parsed to identify one or more parameters of each IOC. For instance, the data may be parsed to identify domain name(s), IP address(es), type(s) of data, email address(es), and the like, associated with the IOC.

In some examples, the parsed data may be compared to known IOC parameters to identify parameters within the IOC that may correspond to known IOCs. If a match is not identified, the newly identified IOC parameters may be stored in a database. The IOC parameters may then be evaluated and one or more linkages associated with each IOC parameter parsed from the IOC may be identified. For instance, other email addresses, domain names, IP addresses, and the like, associated with the IOC parameters of the identified IOC may be identified. This data may then be used to build additional IOC comparison data.

In some examples, machine learning may be used to aid in evaluating one or more IOCs. Accordingly, cyber event analysis and control computing platform 110 may further have, store and/or include a machine learning engine 112b and machine learning datasets 112c. Machine learning engine 112b and machine learning datasets 112c may store instructions and/or data that cause or enable cyber event analysis and control computing platform 110 to evaluate analyzed data (e.g., IOCs, potential IOCs, parsed data, and the like) to determine or identify IOCs or IOC parameters matching known IOCs or IOC parameters, to determine a level of threat posed by an IOC (e.g., type of threat, likelihood of impact, amount of impact, and the like), determine a depth of linkage (e.g., number of steps removed from IOC being evaluated), and the like. The machine learning datasets 112c may be generated based on analyzed data (e.g., data from previously received data, data from internal data computing device 120, data from external data computing device 130, and the like), raw data, and/or received from one or more outside sources.

The machine learning engine 112b may receive data (e.g., data from internal data computing device 120, external data computing device 130, analyzed data from indication of compromise analysis module 112a, and the like) and, using one or more machine learning algorithms, may generate one or more machine learning datasets 112c. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112b may analyze data to identify patterns of activity, sequences of activity, and the like, to generate one or more machine learning datasets 112c.

The machine learning datasets 112c may include machine learning data linking one or more IOCs or IOC parameters to one or more threat levels, amount of impact, and the like. For instance, training data may be used to link one or more known IOCs or IOC parameters with types of threats, amounts or types of impact, likelihood of impact, and the like. Accordingly, these machine learning datasets 112c may be used to evaluate new IOCs or potential IOCs to determine a likelihood of threat, type of threat, potential impact, and the like.

The machine learning datasets 112c may be updated and/or validated based on subsequent data received, for example, after a potential IOC has been identified as an IOC, after updating or validating data is received, or the like.

The machine learning datasets 112c may be used by, for example, a block update module 112d. Block update module 112d may store instructions and/or data that may cause or enable the cyber event analysis and control computing platform 110 to dynamically generate and/or execute one or more blocks. For instance, in some examples, potential IOCs may be evaluated in real-time or near real-time. Accordingly, as IOCs are evaluated and identified, one or more blocks may be dynamically generated and executed in order to protect an entity from a threat associated with the identified IOC. For instance, an entity may maintain a list of websites that are blocked from viewing by users on the entity's network. If a new website is identified as a potential threat based on an identified IOC or linkage to an identified IOC, that list may be dynamically updated and the updates may be pushed out to all systems, devices, and the like, to prevent or minimize impact of the threat from the identified IOC or identified linkage.

In some examples, data associated with IOCs, IOC parameters, and the like, may be stored in a database, such as database 112e.

FIGS. 2A-2D depict an illustrative event sequence for implementing and using cyber event analysis and control functions in accordance with one or more aspects described herein. The events shown in the illustrative event sequence are merely one example sequence and additional events may be added, or events may be omitted, without departing from the invention.

Figure 2A:
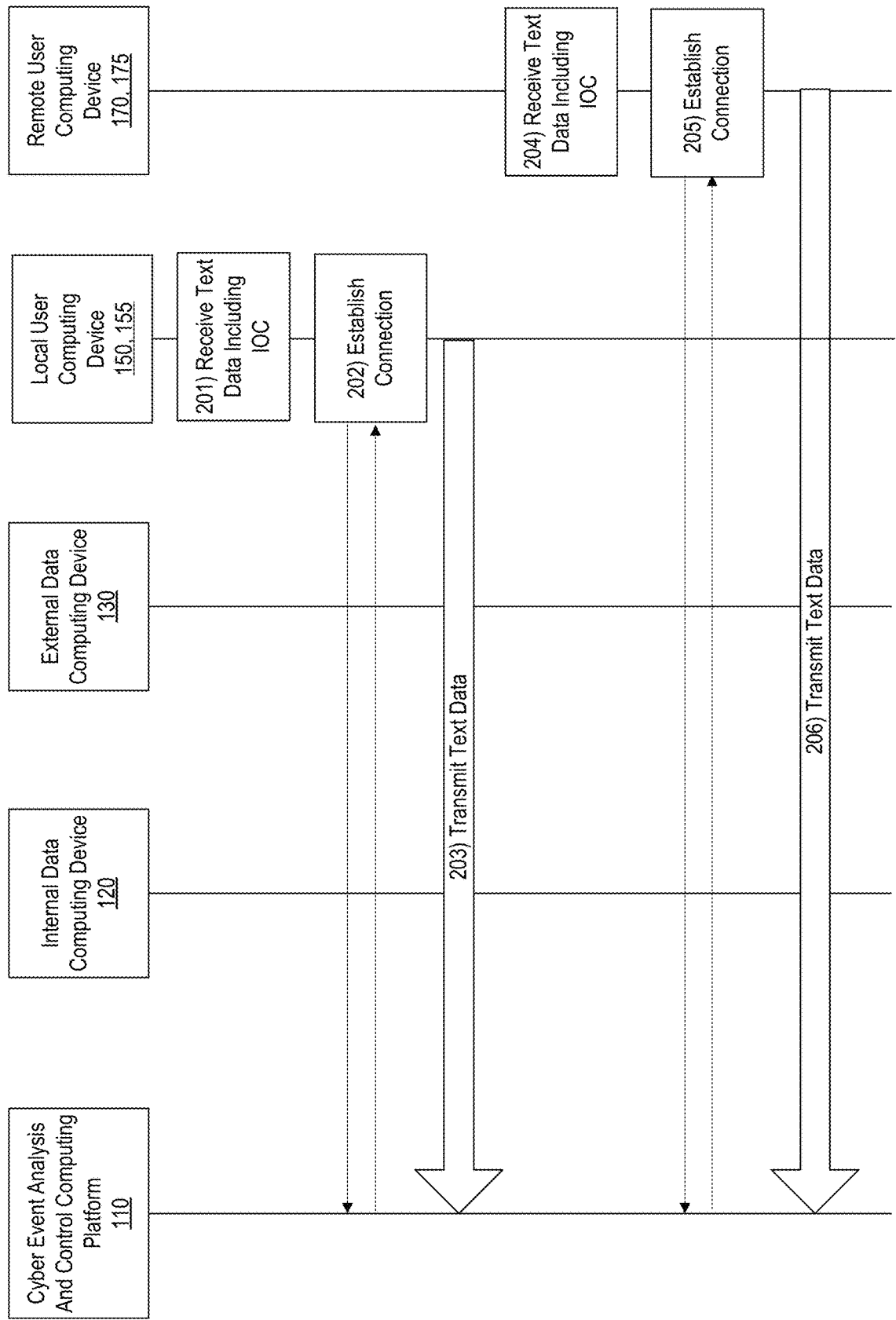

Referring to FIG. 2A, at step 201, indication of compromise (IOC) data may be received. The IOC data may be received in text format and may be received from one or more sources, such as local user computing device 150, local user computing device 155. In some examples, the IOC data may include a document and the cyber event analysis and control computing platform 110 may perform optical character recognition or other processes on the document. In some arrangements, IOC data may be input by a user (e.g., via a computing device).

At step 202, a connection may be established between local user computing device 150, 155 and cyber event analysis and control computing platform 110. For instance, first wireless connection may be initiated and established between the local user computing device 150, 155 and the cyber event analysis and control computing platform 110. The established connection may enable transmission and receipt of data.

At step 203, the received IOC data may be transmitted, via the established first wireless connection, to the cyber event analysis and control computing platform 110.

At step 204, IOC data may be received. The IOC data may be received in text format and may be received from one or more sources, such as remote user computing device 170, remote user computing device 175. In some examples, the IOC data may include a document and the cyber event analysis and control computing platform 110 may perform optical character recognition or other processes on the document. In some arrangements, IOC data may be input by a user (e.g., via a computing device).

At step 205, a connection may be established between remote user computing device 170, 175 and cyber event analysis and control computing platform 110. For instance, a second wireless connection may be initiated and established between the remote user computing device 170, 175 and the cyber event analysis and control computing platform 110. The established connection may enable transmission and receipt of data.

At step 206, the received IOC data may be transmitted, via the established second wireless connection, to the cyber event analysis and control computing platform 110.

Although FIG. 2A illustrates IOC data being received from local user computing device 150, 155 and remote user computing device 170, 175, IOC data may be received from only one of the devices, or one type of device, without departing from the invention.

With reference to FIG. 2B, at 207, the received text IOC data may be parsed. For instance, the text data may be parsed to identify one or more IOC parameters associated with each IOC, such as a domain name, email address, IP address, and the like. In some examples, at step 208, the parsed data may be compared to known IOC parameters to confirm whether the IOC parameters are previously known or newly identified. If newly identified, the IOC parameters may be stored in, for instance, a database associated with cyber event analysis and control computing platform 110.

At step 209, linkages associated with the IOC data and/or IOC parameters may be identified. For instance, in some examples, for each IOC parameter (e.g., domain name, IP address, email address, and the like), other parameters linked to the IOC parameter may be identified (e.g., additional email addresses associated with an IP address, a second domain name related to or owned operated by a same entity as the domain name, or the like). In some examples, identified linkages may go well beyond a first level of linkage. For instance, the cyber event analysis and control computing platform 110 may, once a first level of linkage for the IOC data or IOC parameters is identified, identify a second level of linkage including linkages to linkages identified in the first level of linkage. Accordingly, the cyber event analysis and control computing platform 110 may identify a web or hierarchy of devices, systems, domain names, IP addresses, email addresses, and the like, associated with a known threat. These identified linkages may then be further evaluated. In some examples, machine learning may be used to evaluate threats, determine a likelihood or impact of threat, and the like.

For instance, at step 210, one or more false positives may be identified. In some examples, machine learning may be used to evaluate linkages to identify any identified linkages that match or are similar to known false positives (e.g., email address known to be safe, IP addresses known to not pose a threat, or the like). If, based on the analysis or evaluation to identify false positives, one or more false positive parameters is identified, that parameter may be removed from a list of threats or potential threats (e.g., no longer stored in database or deleted from database).

At step 211, future IOCs may be predicted based on the received and processed data. For instance, machine learning may be used to identify potential IOCs or sources of IOCs by comparing linkages from an IOC to historical IOC data, known impacts, and the like. For example, machine learning may be used to determine that various email addresses that have transmitted malicious emails are associated with a same IP address. Accordingly, the cyber event analysis and control computing platform 110 may identify the IP address as a source of potential future IOCs and may take additional action, such as blocking future communication from the IP address regardless of the email address from which it is received.

For example, with respect to FIG. 2C, at step 212, known blocks may be retrieved. In some examples, known blocks may include email addresses, domain names, and the like, that the system will prevent access to. For instance, the cyber event analysis and control computing platform 110 may prevent receipt of communication from one or more blocked email addresses, may prevent access to websites at one or more domain names, and the like, to reduce or eliminate potential cyber threats. The systems, addresses, applications, and the like that are blocked may be stored by the cyber event analysis and control computing platform 110. Accordingly, the current known blocks may be retrieved at step 212.

At step 213, the known blocks may be dynamically updated based on the IOC data received, analysis and/or evaluation performed, and the like. For instance, the known blocks may be updated dynamically to include any new email addresses, domain names, IP addresses, and the like, that will be blocked (e.g., to which access may be prevented).

At step 214, updated blocks may be dynamically generated (e.g., processes to execute the one or more new blocks may be generated). At step 215, the updated blocks may be executed (e.g., newly identified email addresses, domain names, and the like may be blocked from access).

At step 216, a connection may be established between the cyber event analysis and control computing platform 110 and local user computing device 150, 155. For instance, a third wireless connection may be initiated and established between the cyber event analysis and control computing platform 110 and the local user computing device 150, 155.

Figure 2D:
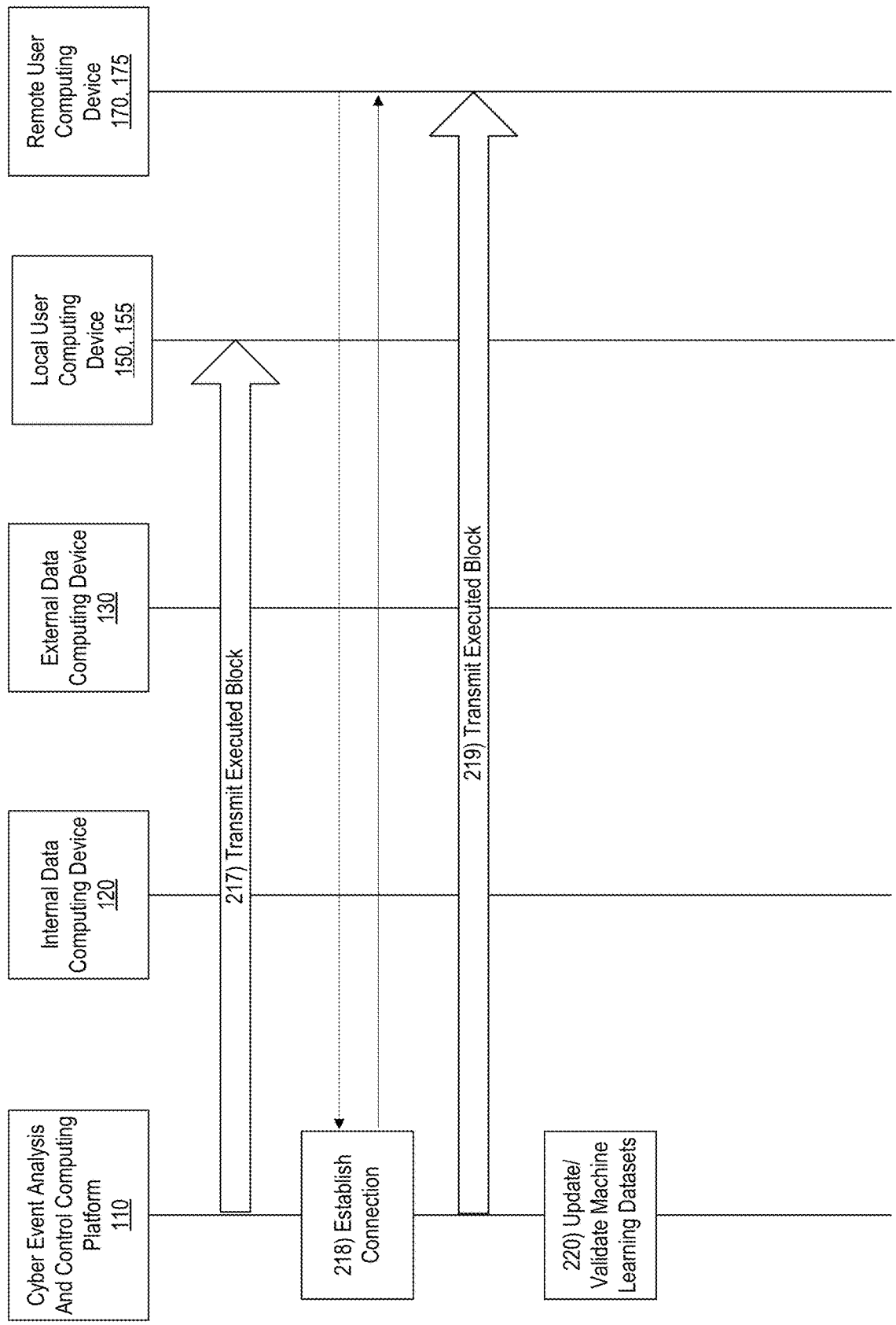

With reference to FIG. 2D, at step 217, the executed block may be transmitted to local user computing device 150, 155. For instance, the executed block may be transmitted to local user computing device 150, 155 via the third wireless connection.

At step 218, a connection may be established between the cyber event analysis and control computing platform 110 and remote user computing device 170, 175. For instance, a fourth wireless connection may be initiated and established between the cyber event analysis and control computing platform 110 and the remote user computing device 170, 175.

At step 219, the executed block may be transmitted to remote user computing device 170, 175. For instance, the executed block may be transmitted to remote user computing device 170, 175 via the fourth wireless connection.

At step 220, the one or more machine learning datasets may be updated and/or validated. For instance, based on the IOC data and associated analysis and evaluation, the one or more datasets used may be updated and/or validated. Accordingly, the machine learning datasets are being refined and accuracy of predictions improved based on newly received and/or analyzed data.

Figure 3:
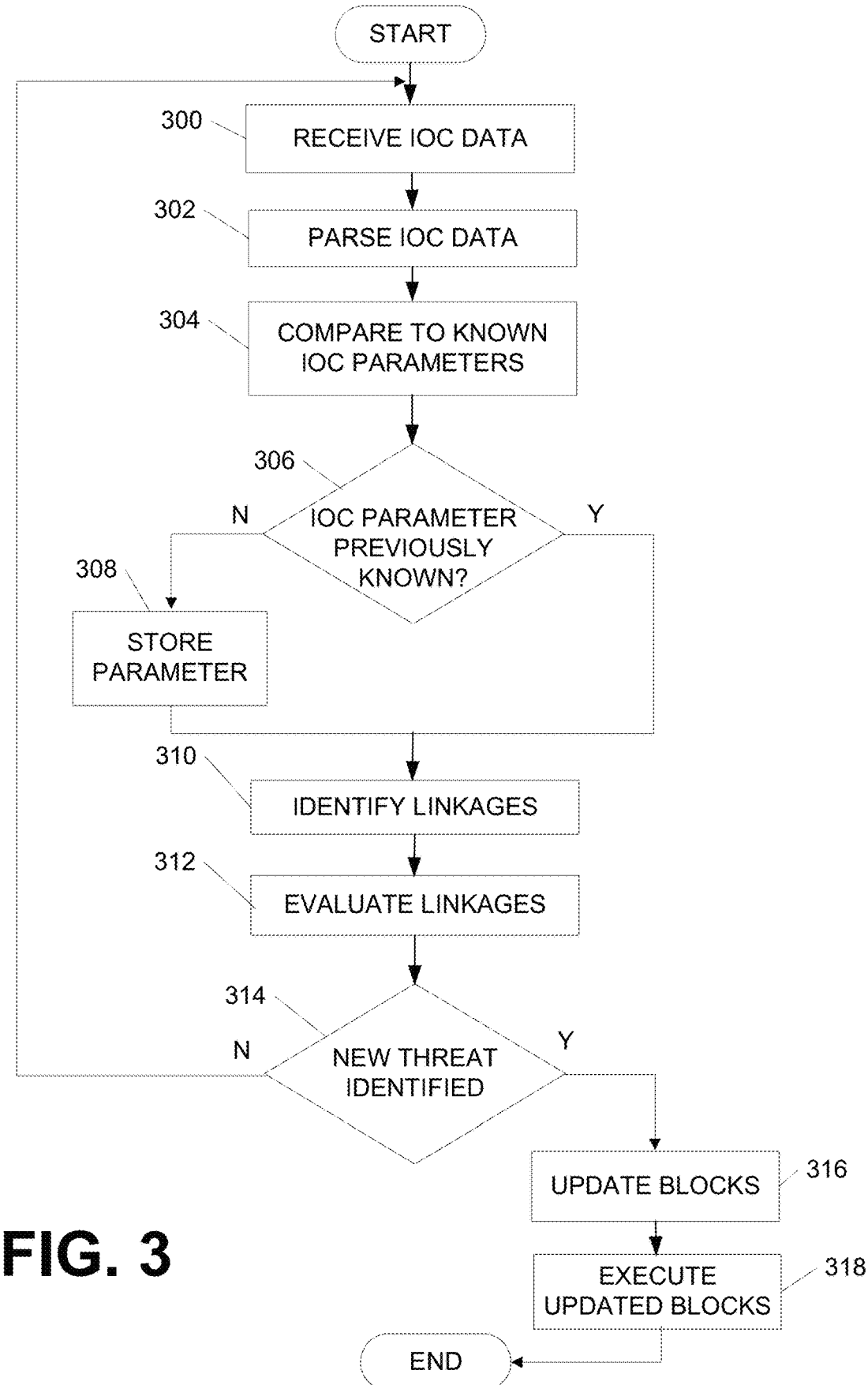
FIG. 3 depicts an illustrative method for implementing and using a system to perform cyber event analysis and control functions, according to one or more aspects described herein.

FIG. 3 is a flow chart illustrating one example method of providing progress recognition and recommendation functions according to one or more aspects described herein. The processes illustrated in FIG. 3 are merely some example processes and functions. The steps shown may be performed in a different order, more steps may be added, or one or more steps may be omitted without departing from the invention.

In step 300, indication of compromise (IOC) data may be received. In some examples, the data may be received from one or more sources, such as local user computing device 150, local user computing device 155, remote user computing device 170, remote user computing device 175, or the like. In some arrangements, the IOC data may be received in text format.

At step 302, the IOC data may be parsed to identify one or more IOC parameters, such as domain name, email address, IP address, and the like. At step 304, the parsed IOC parameters may be compared to known IOC parameters in order to identify any newly identified (e.g., not previously identified) IOC parameters.

At step 306, based on the comparison, a determination may be made as to whether an IOC parameter was previously known. If not, the cyber event analysis and control computing platform 110 may store the newly identified IOC parameter (e.g., as a threat or potential threat) at step 308. The process may then continue to step 310.

If, at step 306, the IOC parameter was previously know, at step 310, one or more linkages associated with the IOC parameter may be identified. For instance, as discussed herein, other email addresses, IP addresses, domain names, and the like, associated with or linked to each IOC parameter may be identified. In some examples, those linkages may represent a first level of linkages. The cyber event analysis and control computing platform 110 may then continue to identify additional linkages to each identified linkage.

At step 312, each identified linkage may be further evaluated. For instance, the identified linkages may be evaluated to identify any false positives, to identify any future IOCs, and the like.

At step 314, based on the evaluated IOC parameters and linkages, a determination may be made as to whether any new blocks should be generated and/or executed. For instance, a determination may be made as to whether a new or previously unidentified threat (e.g., IOC parameter) has been identified. If not (e.g., if no new blocks are needed), the process may return to step 300.

If, at step 314, one or more new threats have been identified, at step 316 a new block may be generated and/or a listing of blocks may be updated to include blocks associated with the newly identified threat. At step 318, the newly identified blocks may be executed to reduce or eliminate a threat associated with an IOC and/or IOC parameter.

As discussed herein, the arrangements described provide for cyber event analysis and control. As discussed herein, analysis of one or more IOCs may be performed in real-time or near real-time to enable efficient and timely response to avoid to mitigate impact of any cyber event. In addition, blocks of one or more domain names, websites, IP addresses, email addresses, and the like, may be dynamically generated and/or executed in real-time or near real-time.

By identifying one or more linkages associated with IOC parameters, the system may quickly and efficiently identify other potential threats which may increase an entity's ability to respond to a potential threat (e.g., block communication to or from an identified device, address, or the like). In one example, IOC data may be received and parsed to identify IOC parameters associated with the IOC. The parameters may include an email address and identified associated with a particular server from which the email address was transmitted. In one example, linkages may be identified including other servers associated with the particular email address, other email addresses associated with the identified server, and the like. The linkages may be evaluated and/or identified as potential threats.

As discussed herein, machine learning may be used to augment the analysis of the IOCs and IOC parameters. For instance, machine learning may be used to determine or rank a depth of a linkage (e.g., how many levels removed from the original IOC). In some examples, machine learning may be used to identify false positives within the parameters (e.g., email addresses, IP addresses, and the like identified as potential threats but known to be safe). In some examples, machine learning may also be used to rate a potential danger associated with an IOC or IOC parameter (e.g., potential for risk), and/or to determine a type of threat associated with the IOC or IOC parameter.

In some examples, identified IOCs or IOC parameters may be cross referenced to past incidents to identify new threats. For instance, if, based on IOC parameter data, it is determined that a particular server is being used to transmit potential malicious data, the system may identify linkages associated with that server. In some examples, those linkages may reveal infrastructure not used in this particular attack but potentially accessible to user to launch another attack. That infrastructure can then be identified as a potential threat and, in some examples, communication to or from the infrastructure may be blocked.

As discussed herein, the system may continuously process IOCs and potential IOCs (e.g., 24 hours/day, 7 days/week). In addition, the system may include computing capacity to generate and/or identify all linkages associated with an IOC or IOC parameter. This may require incredibly fast processing rates of vast amounts of data in order to effectively identify potential threats and take action to mitigate impact prior to or quickly after the cyber event.

Figure 4:
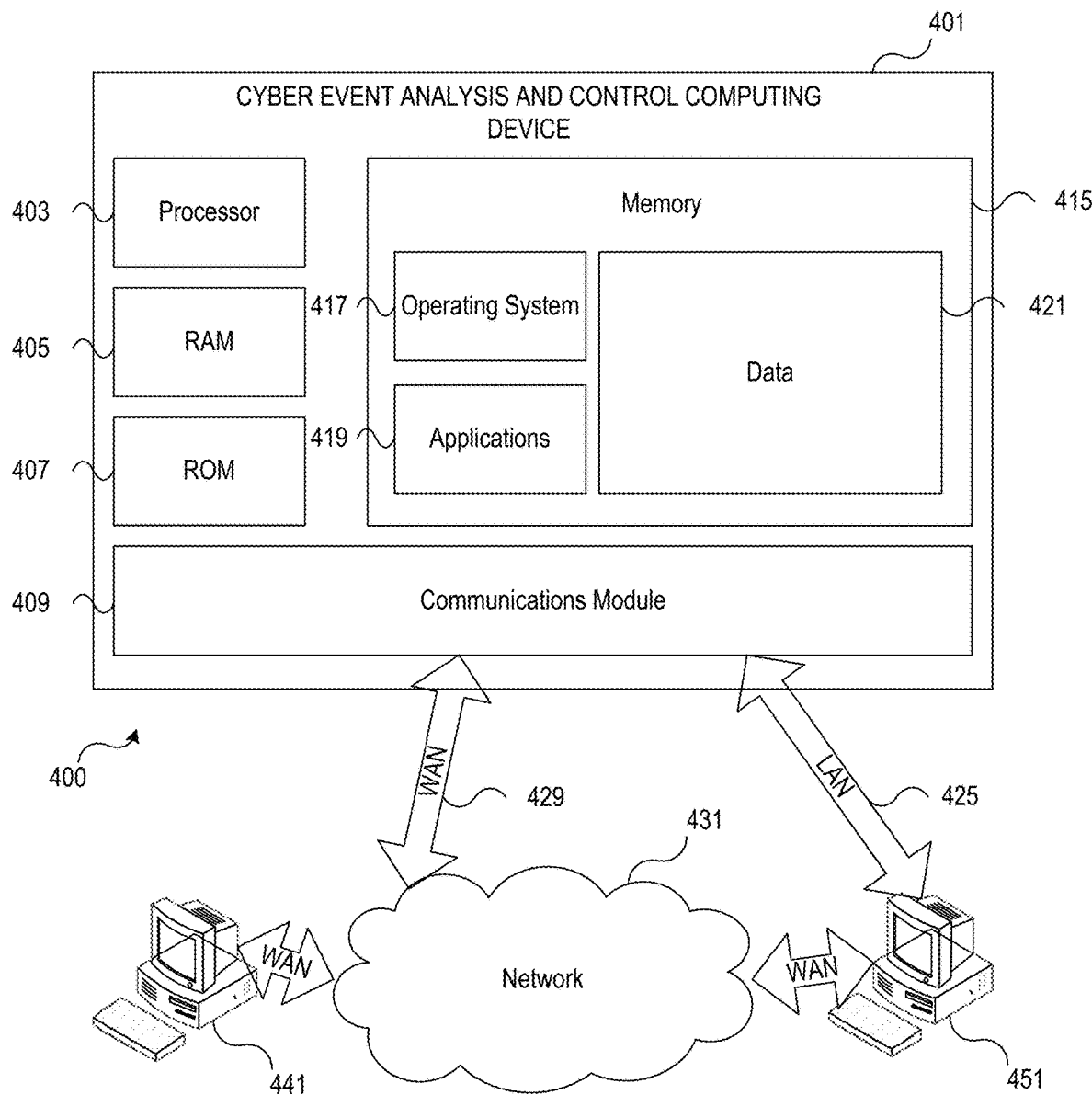
FIG. 4 illustrates one example operating environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include cyber event analysis and control computing device 401 having processor 403 for controlling overall operation of cyber event analysis and control computing device 401 and its associated components, including Random Access Memory (RAM) 405, Read-Only Memory (ROM) 407, communications module 409, and memory 415. Cyber event analysis and control computing device 401 may include a variety of computer readable media. Computer readable media may be any available media that may be accessed by cyber event analysis and control computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on cyber event analysis and control computing device 401. Such a processor may execute computer-executable instructions stored on a computer-readable medium.

Software may be stored within memory 415 and/or storage to provide instructions to processor 403 for enabling cyber event analysis and control computing device 401 to perform various functions as discussed herein. For example, memory 415 may store software used by cyber event analysis and control computing device 401, such as operating system 417, application programs 419, and associated database 421. Also, some or all of the computer executable instructions for cyber event analysis and control computing device 401 may be embodied in hardware or firmware. Although not shown, RAM 405 may include one or more applications representing the application data stored in RAM 405 while cyber event analysis and control computing device 401 is on and corresponding software applications (e.g., software tasks) are running on cyber event analysis and control computing device 401.

Communications module 409 may include a microphone, keypad, touch screen, and/or stylus through which a user of cyber event analysis and control computing device 401 may provide input, and may also include one or more of a speaker for providing audio output and a video display device for providing textual, audiovisual and/or graphical output. Computing system environment 400 may also include optical scanners (not shown).

Cyber event analysis and control computing device 401 may operate in a networked environment supporting connections to one or more remote computing devices, such as computing devices 441 and 451. Computing devices 441 and 451 may be personal computing devices or servers that include any or all of the elements described above relative to cyber event analysis and control computing device 401.

The network connections depicted in FIG. 4 may include Local Area Network (LAN) 625 and Wide Area Network (WAN) 429, as well as other networks. When used in a LAN networking environment, cyber event analysis and control computing device 401 may be connected to LAN 425 through a network interface or adapter in communications module 409. When used in a WAN networking environment, cyber event analysis and control computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 5:
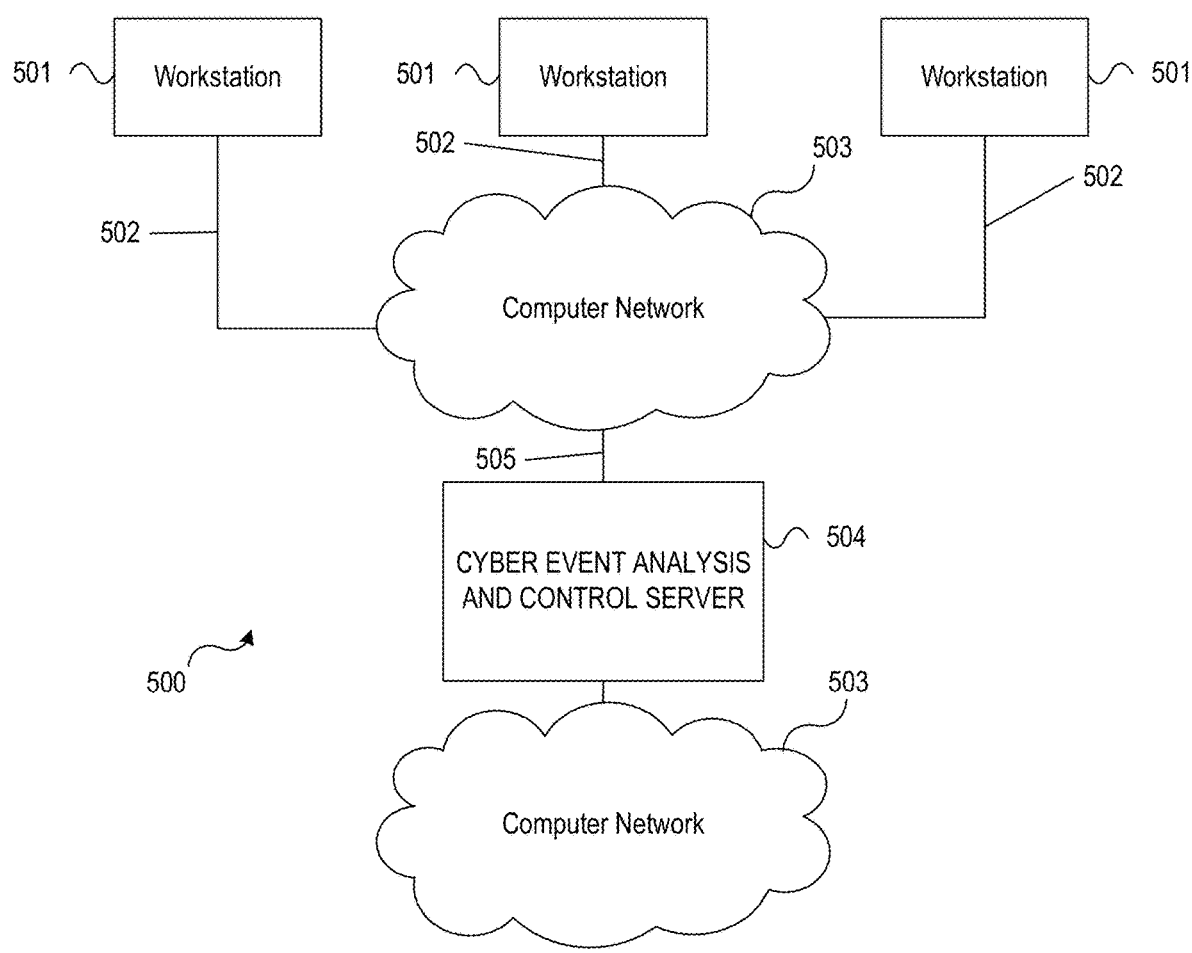
FIG. 5 depicts an illustrative block diagram of workstations and servers that may be used to implement the processes and functions of certain aspects of the present disclosure in accordance with one or more aspects described herein.

FIG. 5 depicts an illustrative block diagram of workstations and servers that may be used to implement the processes and functions of certain aspects of the present disclosure in accordance with one or more example embodiments. Referring to FIG. 5, illustrative system 500 may be used for implementing example embodiments according to the present disclosure. As illustrated, system 500 may include one or more workstation computers 501. Workstation 501 may be, for example, a desktop computer, a smartphone, a wireless device, a tablet computer, a laptop computer, and the like, configured to perform various processes described herein. Workstations 501 may be local or remote, and may be connected by one of communications links 502 to computer network 503 that is linked via communications link 505 to cyber event analysis and control server 504. In system 500, cyber event analysis and control server 504 may be a server, processor, computer, or data processing device, or combination of the same, configured to perform the functions and/or processes described herein. Server 504 may be used to receive data, parse and analyze received data, store newly identified IOC parameters, generate updated blocks, executed updated blocks, and the like.

Computer network 503 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 502 and 505 may be communications links suitable for communicating between workstations 501 and cyber event analysis and control server 504, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A cyber event analysis and control computing platform, comprising:
   at least one processor;
   a communication interface communicatively coupled to the at least one processor; and
   memory storing computer-readable instructions that, when executed by the at least one processor, cause the cyber event analysis and control computing platform to:
   receive indicator of compromise (IOC) data including a plurality of indicators of compromise;
   parse the received IOC data to extract IOC parameters specific to each indicator of compromise;
   compare the extracted IOC parameters to previously identified IOC parameters;

identify, based on the comparing, IOC parameters for evaluation;
identify one or more first level linkages for each IOC parameter identified for evaluation, the first level linkages including first additional parameters associated with each IOC parameter;
evaluate each identified first level linkage of the one or more first level linkages to determine whether the identified first level linkage is associated with a previously unidentified threat;
in response to determining that a first level linkage is associated with a previously unidentified threat:
retrieve a listing of executed blocks;
generate a new block related to the previously unidentified threat;
execute the generated new block;
update the listing of executed blocks; and
identify one or more second level linkages for each additional parameter associated with each IOC parameter, the one or more second level linkages including second additional parameters associated with each first additional parameter.

2. The cyber event analysis and control computing platform of claim 1, wherein the listing of executed blocks including controls to prevent access to communication with or from at least one of: an email address, a domain name and an Internet protocol (IP) address.

3. The cyber event analysis and control computing platform of claim 1, wherein the IOC parameters include at least one of: domain name, email address, and IP address.

4. The cyber event analysis and control computing platform of claim 1, wherein comparing the extracted IOC parameters to previously identified IOC parameters and identifying, based on the comparing, IOC parameters for evaluation further includes:
comparing the extracted IOC parameters to previously identified IOC parameters stored in a database;
determining, based on the comparing, whether each extracted IOC parameter matches an IOC parameter stored in the database;
responsive to determining that each extracted IOC parameter matches and IOC parameters stored in the database, receiving additional IOC data for analysis; and
responsive to determining that each extracted IOC parameter does not match IOC parameters stored in the database, storing each IOC parameter not matching an IOC parameter stored in the database and identifying each IOC not stored in the database for evaluation.

5. The cyber event analysis and control computing platform of claim 1, wherein the IOC data is received in text format.

6. The cyber event analysis and control computing platform of claim 1, wherein evaluating each identified first level linkage of the one or more first level linkages to determine whether the identified first level linkage is associated with a previously unidentified threat further includes determining whether each identified first level linkage is associated with a false positive.

7. The cyber event analysis and control computing platform of claim 6, wherein determining whether each identified first level linkage is associated with a false positive is performed using machine learning.

8. The cyber event analysis and control computing platform of claim 1, further including instructions that, when executed, cause the cyber event analysis and control computing platform to:
predict a future IOC based on machine learning.

9. A method, comprising:
at a computing platform comprising at least one processor, memory, and a communication interface:
receiving, by the at least one processor and via the communication interface, indicator of compromise (IOC) data including a plurality of indicators of compromise;
parsing, by the at least one processor, the received IOC data to extract IOC parameters specific to each indicator of compromise;
comparing, by the at least one processor, the extracted IOC parameters to previously identified IOC parameters;
identifying, by the at least one processor and based on the comparing, IOC parameters for evaluation;
identifying, by the at least one processor, one or more first level linkages for each IOC parameter identified for evaluation, the first level linkages including first additional parameters associated with each IOC parameter;
evaluating, by the at least one processor, each identified first level linkage of the one or more first level linkages to determine whether the identified first level linkage is associated with a previously unidentified threat;
in response to determining that a first level linkage is associated with a previously unidentified threat:
retrieving, by the at least one processor, a listing of executed blocks;
generating, by the at least one processor, a new block related to the previously unidentified threat;
executing, by the at least one processor, the generated new block;
updating, by the at least one processor, the listing of executed blocks; and
identifying, by the at least one processor, one or more second level linkages for each additional parameter associated with each IOC parameter, the one or more second level linkages including second additional parameters associated with each first additional parameter.

10. The method of claim 9, wherein the listing of executed blocks including controls to prevent access to communication with or from at least one of: an email address, a domain name and an Internet protocol (IP) address.

11. The method of claim 9, wherein the IOC parameters include at least one of:
domain name, email address, and IP address.

12. The method of claim 9, wherein comparing the extracted IOC parameters to previously identified IOC parameters and identifying, based on the comparing, IOC parameters for evaluation further includes:
comparing the extracted IOC parameters to previously identified IOC parameters stored in a database;
determining, based on the comparing, whether each extracted IOC parameter matches an IOC parameter stored in the database;
responsive to determining that each extracted IOC parameter matches and IOC parameter stored in the database, receiving additional IOC data for analysis; and
responsive to determining that each extracted IOC parameter does not match an IOC parameter stored in the database, storing each IOC parameters not matching an IOC parameter stored in the database and identifying each IOC not stored in the database for evaluation.

13. The method of claim 9, wherein the IOC data is received in text format.

14. The method of claim 9, wherein evaluating each identified first level linkage of the one or more first level linkages to determine whether the identified first level linkage is associated with a previously unidentified threat further includes determining whether each identified first level linkage is associated with a false positive.

15. The method of claim 14, wherein determining whether each identified first level linkage is associated with a false positive is performed using machine learning.

16. The method of claim 9, further including predicting, by the at least one processor, a future IOC based on machine learning.

17. One or more non-transitory computer-readable media storing instructions that, when executed by a computing platform comprising at least one processor, memory, and a communication interface, cause the computing platform to:
receive indicator of compromise (IOC) data including a plurality of indicators of compromise;
parse the received IOC data to extract IOC parameters specific to each indicator of compromise;
compare the extracted IOC parameters to previously identified IOC parameters;
identify, based on the comparing, IOC parameters for evaluation;
identify one or more first level linkages for each IOC parameter identified for evaluation, the first level linkages including first additional parameters associated with each IOC parameter;
evaluate each identified first level linkage of the one or more first level linkages to determine whether the identified first level linkage is associated with a previously unidentified threat;
in response to determining that a first level linkage is associated with a previously unidentified threat:
retrieve a listing of executed blocks;
generate a new block related to the previously unidentified threat;
execute the generated new block;
update the listing of executed blocks; and
identify one or more second level linkages for each additional parameter associated with each IOC parameter, the one or more second level linkages including second additional parameters associated with each first additional parameter.

18. The one or more non-transitory computer-readable media of claim 17, wherein the listing of executed blocks including controls to prevent access to communication with or from at least one of: an email address, a domain name and an Internet protocol (IP) address.

19. The one or more non-transitory computer-readable media of claim 17, wherein the IOC parameters include at least one of: domain name, email address, and IP address.

20. The one or more non-transitory computer-readable media of claim 17, wherein comparing the extracted IOC parameters to previously identified IOC parameters and identifying, based on the comparing, IOC parameters for evaluation further includes:
comparing the extracted IOC parameters to previously identified IOC parameters stored in a database;
determining, based on the comparing, whether each extracted IOC parameter matches an IOC parameter stored in the database;
responsive to determining that each extracted IOC parameter matches an IOC parameter stored in the database, receiving additional IOC data for analysis; and
responsive to determining that each extracted IOC parameter does not match IOC parameters stored in the database, storing each IOC parameter not matching an IOC parameter stored in the database and identifying each IOC not stored in the database for evaluation.

21. The one or more non-transitory computer-readable media of claim 17, wherein the IOC data is received in text format.

22. The one or more non-transitory computer-readable media of claim 17, wherein evaluating each identified first level linkage of the one or more first level linkages to determine whether the identified first level linkage is associated with a previously unidentified threat further includes determining whether each identified first level linkage is associated with a false positive.

23. The one or more non-transitory computer-readable media of claim 22, wherein determining whether each identified first level linkage is associated with a false positive is performed using machine learning.

24. The one or more non-transitory computer-readable media of claim 17, further including instructions that, when executed, cause the computing platform to:
predict a future IOC based on machine learning.

* * * * *